J. H. KNIPP.
CANE STRIPPER.
APPLICATION FILED JULY 10, 1915.
1,172,216.
Patented Feb. 15, 1916.
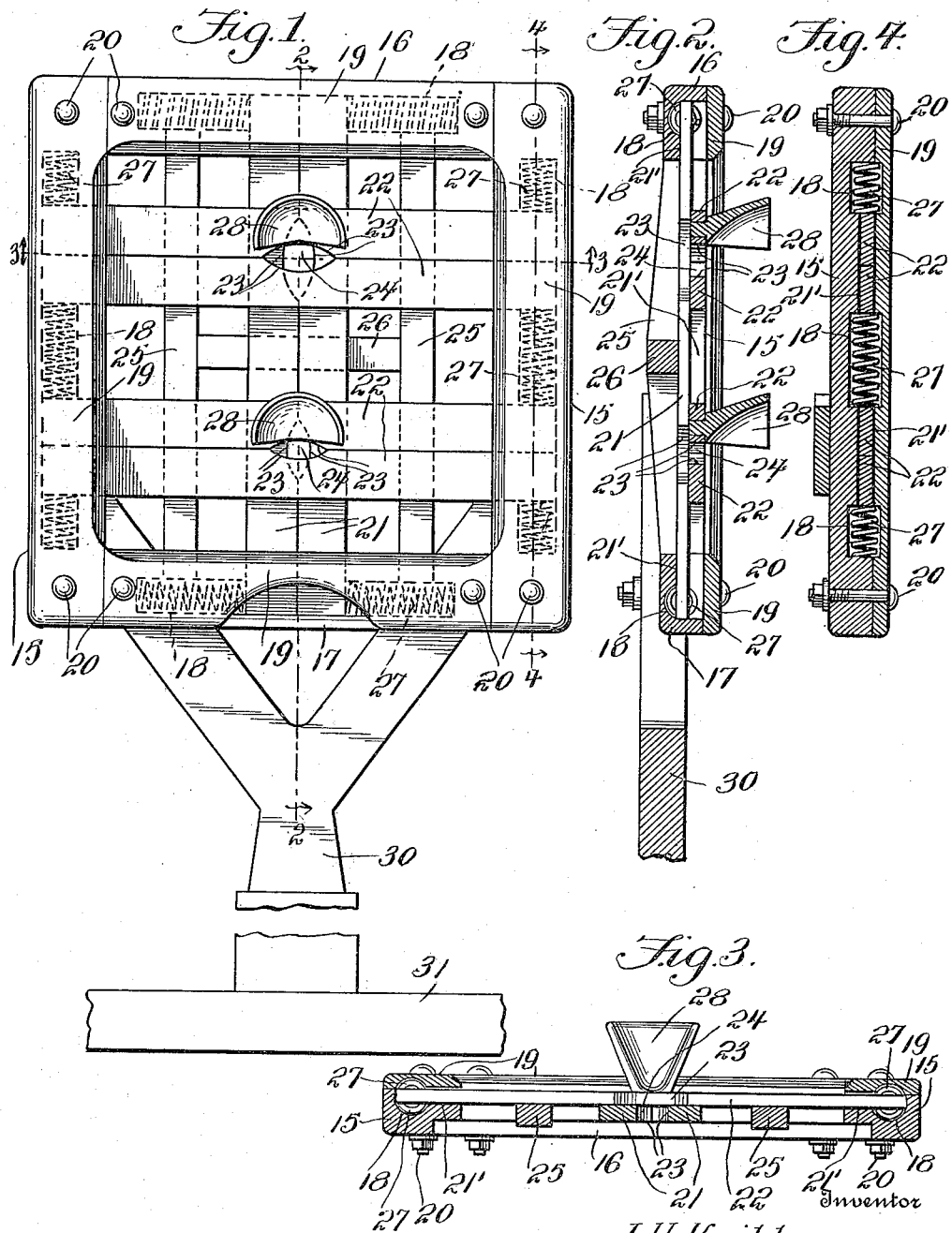
Witnesses
J. L. Wright
Inventor
J. H. Knipp
By Victor J. Evans
Attorney
THE COLUMBIA PLANOGRAPH CO., WASHINGTON, D. C.

UNITED STATES PATENT OFFICE.

JAMES H. KNIPP, OF McGLONE, KENTUCKY, ASSIGNOR OF ONE-HALF TO WILLIAM B. WHITT, OF McGLONE, KENTUCKY.

CANE-STRIPPER.

1,172,216.     Specification of Letters Patent.     Patented Feb. 15, 1916.

Application filed July 10, 1915. Serial No. 39,168.

*To all whom it may concern:*

Be it known that I, JAMES H. KNIPP, a citizen of the United States, residing at McGlone, in the county of Carter and State of Kentucky, have invented new and useful Improvements in Cane-Strippers, of which the following is a specification.

This invention relates to cane strippers, and it has for its object to produce a simple and effective device for stripping the leaves from stalks of sugar cane, sorghum and the like.

A further object of the invention is to produce a device of the class described having a plurality of stripping devices for stalks of different sizes, some of the stripping elements or members being common to all of the stripping devices.

A further object of the invention is to produce a stripping device including a frame mounted on a support, said frame being equipped with resiliently supported coöperating stripping members arranged in pairs at substantially right angles to each other, one set of such stripping members being arranged to coöperate with a plurality of sets of stripping members disposed angularly with respect thereto.

A further object of the invention is to provide each stripping device with a simple and improved guide member mounted on one of the stripping members.

With these and other ends in view which will readily appear as the nature of the invention is better understood, the same consists in the improved construction and novel arrangement and combination of parts which will be hereinafter fully described and particularly pointed out in the claims.

In the accompanying drawing has been illustrated a simple and preferred form of the invention, it being, however, understood that no limitation is necessarily made to the precise structural details therein exhibited, but that changes, alterations and modifications within the scope of the claims may be resorted to when desired.

In the drawing, Figure 1 is a view in elevation of a cane stripper constructed in accordance with the invention. Fig. 2 is a vertical sectional view taken on the line 2—2 in Fig. 1. Fig. 3 is a transverse sectional view taken on the line 3—3 in Fig. 1. Fig. 4 is a sectional view taken on the line 4—4 in Fig. 1.

Corresponding parts in the several figures are denoted by like characters of reference.

The frame of the improved device is composed of side members 15 and top and bottom members 16, 17. Said side, top and bottom members are each provided with longitudinal grooves or channels 18 and with correspondingly grooved or channeled cap pieces 19 which are detachably connected therewith by screws or bolts 20 said cap pieces combining with the side, top and bottom pieces of the frame to constitute housings for the accommodation of the ends of the stripping members and the springs by which said stripping members are actuated. The housings are provided with slots 21' in the inner walls thereof for the passage of the end portions of the stripping members 21, 22. The stripping members have been shown as consisting of flat strips of metal arranged in pairs, one pair of strips 21 being disposed vertically in the frame and a plurality of pairs of strips 22 being disposed transversely with respect to the frame. The strips 21 have been shown as being arranged adjacent to the rear face of the frame, the strips 22 being positioned in crosswise relation to the strips 21 and adjacent to the front portion of the frame. The several pairs of stripping members are provided in their meeting faces with shallow arcuate recesses 23, said recesses being disposed at the points of intersection of the vertical strips with the horizontal strips, and said recesses being of different dimensions at the different points of intersection, thus producing a plurality of feed openings 24 of different dimensions for the insertion of the tip ends of the stalks, the number of feed openings being equal to the number of pairs of stripping members 22, each pair of stripping members 22 intersecting the one pair of stripping members 21. The stripping members 22 are supported by brace bars 25 that extend between the top and bottom members 16, 17 of the frame with which said brace bars are connected. The stripping members 21 are supported by a brace bar 26 extending between the brace bars 25 with which said brace bar 26 is connected, the brace bar 26 being offset rearwardly from the front face of the brace bars 25 a distance equal to the thickness of the stripping members 21.

Arranged in the grooves or channels of the respective housings formed by the side, top and bottom members of the frame in connection with the cap pieces 19 are coiled springs 27 that exert tension on the ends of the respective stripping members to push the stripping members of each pair in the direction of each other, holding them yieldably together in such fashion that they may be spread apart by the action of a stalk or cane passing therebetween.

One unit of each pair of stripping members 22 carries a pivotally supported guide member 28 which may be described as being of semi-conical shape, presenting a curved face, the side edges of which converge in the direction of the feed opening 24. These guide members will greatly facilitate the insertion of the tips of the stalks into the said feed openings, as will be readily understood.

The frame of the stripping device has been shown as being mounted on an upright 30 which may be secured in a base or foot piece 31 for the purpose of supporting the stripping frame in an upright position at a convenient elevation.

The operation and advantages of this invention will be readily understood from the foregoing description taken in connection with the drawing hereto annexed. The tips of the stalks from which leaves are to be stripped are inserted in one or the other of the feed openings 24 from the front side of the frame, the tip being grasped by an operator stationed behind the frame and who pulls the stalk through the frame, the leaves being stripped therefrom by the action of the stripping members, as will be readily understood, said stripping members engaging the stalk yieldingly to permit the passage of a stalk of any diameter. By this device the stalks or canes may be quickly and effectively stripped and made ready for the cane mill.

Having thus described the invention, what is claimed as new, is:—

1. In a cane stripper, a rectangular frame opposed members of which constitute housings having slots in their inner side walls, a pair of stripping members guided in the slots of the opposed housings, and springs within the housings operating to force the stripping members in the direction of each other.

2. In a cane stripper, a rectangular frame opposed members of which constitute housings having slots in their inner side walls, a pair of stripping members guided in the slots of the opposed housings, and springs within the housings operating to force the stripping members in the direction of each other, said stripping members being provided with arcuate recesses in their meeting faces.

3. In a cane stripping device, a rectangular frame opposed members of which constitute housings having slots in their inner side walls, a plurality of pairs of stripping members guided in the slots, and springs arranged in the housings and forcing the stripping members of each pair in the direction of each other.

4. In a cane stripping device, a frame, the side, top and bottom members of which constitute housings having slots in their inner side walls, a plurality of pairs of spring actuated stripping members guided in the slots of opposed side members, and a single pair of spring actuated stripping members guided in the slots of the top and bottom members, the stripping members of each pair being provided in their meeting faces with arcuate recesses producing feed openings at the points of intersection of the several pairs of stripping members.

5. In a cane stripping device, a frame, the side, top and bottom members of which constitute housings having slots in their inner side walls, a plurality of pairs of spring actuated stripping members guided in the slots of opposed side members, and a single pair of spring actuated stripping members guided in the slots of the top and bottom members, the stripping members of each pair being provided in their meeting faces with arcuate recesses producing feed openings at the points of intersection of the several pairs of stripping members, in combination with guide members pivotally mounted adjacent to the feed openings.

In testimony whereof I affix my signature in presence of two witnesses.

JAMES H. KNIPP.

Witnesses:
H. L. CLAY,
E. H. BARKER.